May 18, 1965     F. R. VAN VLEET     3,184,244
SHAFT SEAL
Original Filed July 20, 1961
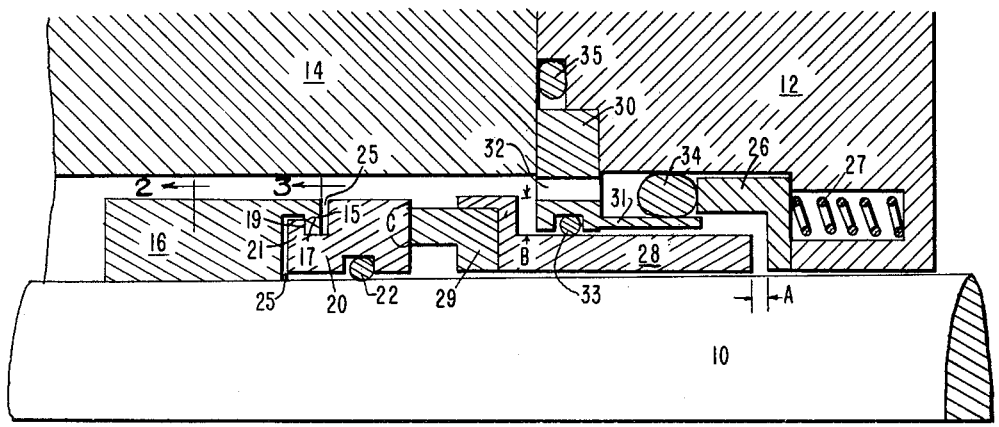
FIG. 1
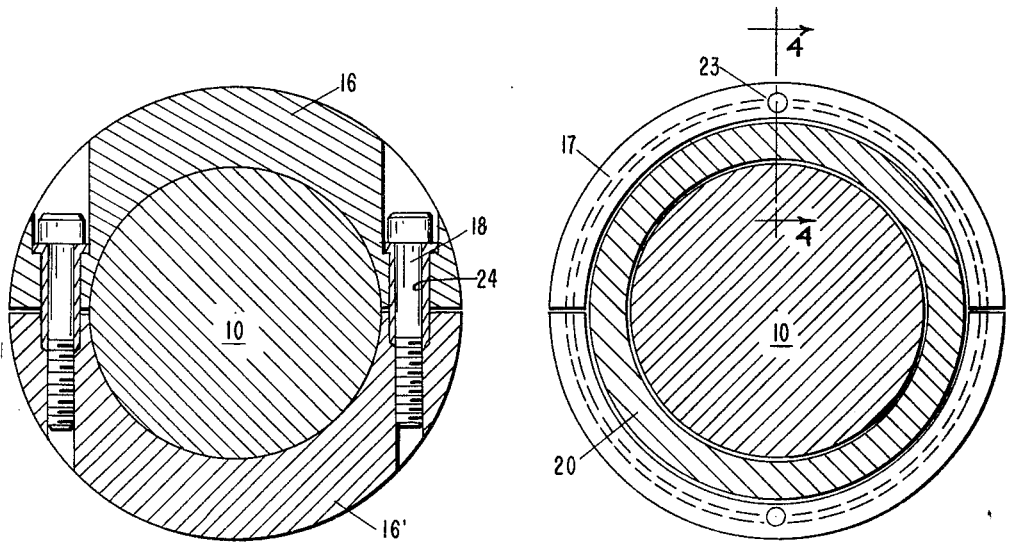
FIG. 2
FIG. 3
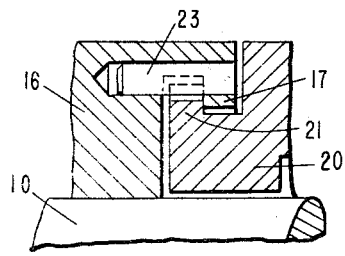
FIG. 4
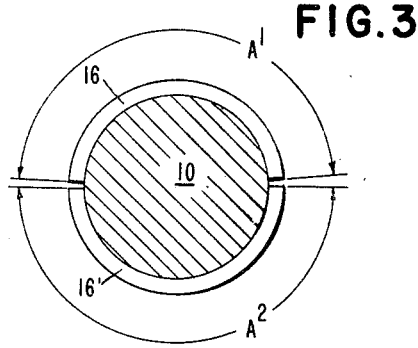
FIG. 5

United States Patent Office
3,184,244
Patented May 18, 1965

3,184,244
SHAFT SEAL
Frank R. Van Vleet, North Reading, Mass., assignor to A. W. Chesterton Company, Everett, Mass., a corporation of Massachusetts
Original application July 20, 1961, Ser. No. 125,512. Divided and this application Apr. 5, 1963, Ser. No. 270,874
3 Claims. (Cl. 277—83)

This invention comprises a new and improved fluid seal for a shaft rotating in a stationary stuffing box or gland, and is a division of my co-pending application Serial No. 125,512, filed July 20, 1961.

A major object of the invention is the provision of a seal having a uniquely accurate contact face.

In such seals as heretofore constructed, the rotary element of the seal has been subject to distortion due to forces imposed on it or its support by clamping to a rotary shaft or the like. This distortion has in turn affected the sealing surface so that the desired sealing could not be achieved.

To solve this problem, the present invention provides an improved construction of the rotary elements of the seal, such that an accurate sealing face is secured for engagement with the cooperating sealing face of the non-rotating elements of the seal. To this end the shaft is provided with a pair of rotary ring elements, a segmented clamping ring and an integral unbroken sealing ring, whereby the clamping and sealing functions of the seal are mechanically separated so that clamping forces cannot affect the sealing function. The segmented clamping ring is provided with suitable means clamping it to the shaft, and aligning the faces of its segments perpendicular to the shaft and in the same plane with one another together to define an aligning face defining a surface perpendicular to the axis of the shaft when the segmented ring is clamped on the shaft. Also, the total angular extent of its segments is less than 360 degrees to space the ring segments from one another when clamped on the shaft. The unbroken integral ring has a sealing face at one end thereof and an aligning face at the other end thereof, the aligning face on the segmented ring cooperating with the aligning face on the integral unbroken ring by reason of biasing means such as springs acting through the cooperating sealing face for maintaining the aligning faces in contact with one another to maintain the aligning and sealing faces, preferably flat and in a plane perpendicular to the axis of the shaft, in contact with one another, even in the absence of fluid pressure applied across the rings. The aligning faces of the rings are maintained in contact with one another so that the integral unbroken ring preferably has limited freedom of movement with respect to the segmented ring, the former hence being generally unstressed for the purpose of maintaining an undistorted sealing surface. Preferably, too, means are provided connecting the rings preventing relative rotation for simultaneous rotation. One of said rings may include an inturned flange and the other an outturned flange interlocked therewith, the aligning faces being provided on said flanges providing contact of an aligning face regardless of the direction of application of fluid pressure to the rings. With this construction, the segmented ring may be clamped to the shaft without danger of distortion of its aligning face, while the integral unbroken ring is relieved of all clamping strains that might otherwise disturb the accuracy of its end contact face, annular sealing means such as an O ring being provided between said ring and shaft.

Another major object of the invention is to relieve the axially movable elements of the seal from all mechanical interference or hindrance to their designed fluid pressure action under conditions of rotation. In seals as heretofore constructed fluid pressure has been transmitted through an active and movable or dynamic O ring interposed between a stationary wall of the stuffing box and an axially movable element of the seal and it has sometimes happened that the ring has imparted a mechanical drag in one direction or the other to the movable element which has increased or decreased the desired and delicately balanced movement of the element under fluid pressure alone. I have discovered that this difficulty may be obviated by providing an intermediate axially stationary element between the shaft and the walls of the stuffing box so that the dynamic O-ring is engaged between axially stationary surfaces and can have no direct effect on the elements movable under fluid pressure. This movable and pressure transmitting O-ring is herein termed a dynamic O-ring.

As herein shown and in accordance with an important feature of the invention the intermediate member takes the form of a flanged disk having an elongated tubular stem concentrically surrounding the axially movable element of the seal, and is held stationary by fitting its flange into a recess in the gland of the stuffing box. The dynamic O-ring may thus be located between a stationary concave surface of the gland and the stationary convex surface of the flanged intermediate member. The longitudinally movable member of the seal is thus left free to move axially under fluid pressure alone within the bore of the bore of the intermediate member.

These and other features of the invention will be best understood and appreciated from the following description of a preferred embodiment thereof, selected for purposes of illustration and shown in the accompanying drawings, in which:

FIG. 1 is a half longitudinal section taken on the axis of the shaft;

FIG. 2 is a complete cross sectional view on the line 2—2 of FIG. 1;

FIG. 3 is a similar cross sectional view on the line 3—3 of FIG. 1;

FIG. 4 is a fragmentary longitudinal section on an angle different from that of FIG. 1; and FIG. 5 is a diagrammatic view showing the arcuate relationships of the portions of the segmented ring, $A^1$ and $A^2$.

The shaft 10 is arranged to rotate within a stationary external housing 14 which includes a stuffing box or gland 12 bored to form together an elongated fluid pressure chamber about the shaft. The rotating elements of the seal comprise a two-part segmented clamping ring 16, 16', connected to an integral unbroken ring 20. The two parts 16, 16' of the rotary ring are complementary half rings or semi-circular segments of less than 180 degrees arc and these are turned to fit accurately upon the shaft and remain separated thereon by a few thousandths of an inch, say 5 to 50 thousandths. The two parts 16, 16' are bored to receive hollow dowels 24 by which the alignment of the two parts, particularly to maintain their operating surfaces in the same plane perpendicular to the shaft, is positively insured and maintained. Clamping bolts, seated in the half ring 16, pass through the dowels and are threaded into the half ring 16'. As herein shown the ring hand end of the clamping ring is recessed and provided with an inturned annular flange 17. By reason of the clearance between the segments of the ring, which together have a total arc of less than 360 degrees, the inner surfaces of the half rings intimately contact the shaft surfaces throughout their entire arc, regardless of minor errors in shaft diameter, since they can bend slightly to accommodate such errors. Nevertheless, such bending does not affect the alignment of the working surfaces of the half rings perpendicular to the axis of the shaft, a unique contribution according to the present invention.

The integral ring 20 is bored to fit the shaft 10 with substantial clearance and grooved in its inner face to contain an O-ring 22. Its left hand end is shouldered and provided with a portion of reduced diameter fitting within the recess in the inner face of the two-part segmented ring and having also an out-turned flange 21 arranged to interlock with the flange 17 of the clamping ring, the aligning faces on the rings, which operate as its working surfaces, face 15 on the two-part ring and face 19 on the integral ring, being parallel to one another. In FIG. 1, the rings are shown in contact due to pressure imposed in a direction from the left in FIG. 1. If pressure is imposed in the opposite direction the rings will shift in a direction toward one another and one or the other set of aligning surfaces, herein shown at the sides of gaps 25, will be moved into contact with one another as working surfaces, and a gap will be established between faces 15 and 19. The two flanges are bored at diametrically opposite points to receive locking pins 23 that hold the rings together so that they rotate as one with the shaft 10, yet provide limited freedom of movement of the integral ring 20 with respect to the segmented ring. The right hand radial end face C of the integral ring 20 is parallel with ring aligning face 19 and is lapped to form one contact or sealing face of the seal, which face is maintained in a plane perpendicular to the axis of shaft 10 by aligning faces 15 and 19, as shown in FIG. 1, or the aligning faces on opposite sides of one of gap 25. In assembling these parts the integral ring 20 with its O-ring 22 is first slipped on the shaft, then the half rings 16 and 16' are fitted upon it with the connecting pins 23 and finally the clamping bolts 18 are turned home. The result is that the integral ring 20 is accurately secured to the shaft without any tendency to distort its sealing face.

The non-rotating elements of the seal include a floating piston or adaptor 26 having an annular forwardly projecting rim and shown as being urged toward the left by compression springs 27 contained in sockets formed in the stationary body of the gland 12 and spaced about the back of the piston.

An elongated sleeve 28 movable on the shaft is recessed and flanged at its left hand end to receive and hold a ring 29, also recessed and flanged to present a radial end surface accurately squared and lapped to form the cooperating non-rotary contact face of the seal with the ring 29 in the area C.

The housing gland 12 is recessed to receive and hold a disk 30 having a hollow or tubular stem 31, extending toward the right and surrounding with clearance the body of the sleeve 28. The body of the disk 30 is bored at several points to provide fluid passages 32, one of which is shown in FIG. 1, and the inner wall of the disk is grooved to receive an O-ring 33 which makes a seal between the disk 30 and the sleeve 28.

An annular passage is formed between the inner wall of the gland 12 and the outer cylindrical wall of the stem 31 and in this passage is placed a dynamic O-ring 34 which is in contact with the rim of the piston 26 and moved thereby when the piston is advanced by the springs 27 against decreasing fluid pressure in the chamber.

It is important to relieve the contact faces of all spring pressure during the normal running of the shaft so that the contact faces at C shall be engaged only by balanced fluid pressure. Accordingly as the fluid pressure builds up the piston 26 is retracted until it brings up against the solid wall of the gland as shown in FIG. 1 and the effective pressure of the springs 27 is eliminated from the contact faces at C while the space A is opened. As the pressure drops the piston is advanced by the springs, closing the space A and the dynamic O-ring 34 is moved toward the left but without imparting any drag to the sleeve 28 or pressure to the contact faces at C. This is prevented by the stem 31 that is interposed between the sleeve 28 and the O-ring as already explained. The area of the O-ring 34 upon which pressure is effective in moving the piston 26 to the right or to its spring retracting position is greater than the area B of the sleeve 28 upon which the pressure is effective in moving the sleeve to the left.

Fluid pressure within the chamber, in the absence of effective pressure by the springs 27, is balanced by pressure in the area B so that the contact faces at C are engaged with light pressure permitting a film of oil to lubricate them under running conditions and so reducing wear to a minimum.

When the fluid pressure builds up in the chamber it acts through the O-ring 34 against the rim of the piston to force the the piston 12 toward the right until it is arrested in the position shown in FIG. 1.

Having thus disclosed my invention and described in detail an illustrative embodiment thereof, I claim as new and desire to secure by Letters Patent:

1. In a fluid pressure seal for a shaft rotating in a housing and having a cooperating sealing face carried by said housing, a segmented ring having a plurality of segments with a total angular extent of less than 360 degrees and means clamping said segments upon said shaft providing clearance between the ends of said segments, said segments providing aligning faces defining planar surfaces positioned in the same plane perpendicular to the axis of said shaft when clamped thereon, in combination with an integral unbroken ring spaced from the shaft and having a planar rotating sealing face at one end thereof and a planar aligning face parallel thereto at the other end thereof, said rotating sealing face defining a planar surface perpendicular to said shaft, said aligning faces on said segmented ring cooperating with said aligning face on said integral unbroken ring to establish said rotating sealing face in a plane perpendicular to the axis of said shaft, biasing means acting through said cooperating sealing face for continuously maintaining said aligning faces in contact with one another in the absence of fluid pressure applied to said rings, annular sealing means positioned between said integral ring and said shaft, means preventing relative rotation of said rings, said integral unbroken ring being thus connected to the shaft in a condition free of external stress with its said rotating sealing face in engagement with said cooperating sealing face establishing said sealing faces in a plane perpendicular to said shaft.

2. In a fluid pressure seal as claimed in claim 1, wherein one of said rings includes an inturned flange and the other of said rings includes an out-turned flange interlocked within said inturned flange, said aligning faces being provided on each side of said flanges providing contact of an aligning face regardless of the direction of application of fluid pressure to said rings.

3. In a fluid pressure seal as claimed in claim 2, wherein said segmented ring has said inturned flange and said integral unbroken ring has said out-turned flange.

References Cited by the Examiner
UNITED STATES PATENTS

| 808,082 | 12/05 | Fuller | 277—81 |
| 1,947,017 | 2/34 | McHugh | 277—28 |
| 2,526,590 | 10/50 | Summers | 277—81 |
| 2,999,702 | 9/61 | Dunn et al. | 277—83 |
| 3,068,012 | 12/62 | Van Vleet | 277—27 |
| 3,081,098 | 3/63 | Stephens | 277—815 |

LEWIS J. LENNY, *Primary Examiner.*

SAMUEL ROTHBERG, *Examiner.*